United States Patent
Moon et al.

(10) Patent No.: US 10,119,226 B2
(45) Date of Patent: Nov. 6, 2018

(54) APPARATUS AND METHOD FOR MANUFACTURING MULTILAYER FELT

(71) Applicant: Hyundai Motor Company, Seoul (KR)

(72) Inventors: Tae Oh Moon, Incheon (KR); Dae Ik Jung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 1050 days.

(21) Appl. No.: 14/505,784

(22) Filed: Oct. 3, 2014

(65) Prior Publication Data
US 2015/0204021 A1    Jul. 23, 2015

(30) Foreign Application Priority Data
Jan. 21, 2014 (KR) .................. 10-2014-0006982

(51) Int. Cl.
| | | |
|---|---|---|
| D21H 27/38 | (2006.01) | |
| D21F 7/08 | (2006.01) | |
| B32B 5/02 | (2006.01) | |
| B32B 5/22 | (2006.01) | |
| B32B 5/26 | (2006.01) | |

(52) U.S. Cl.
CPC ............. *D21H 27/38* (2013.01); *B32B 5/022* (2013.01); *B32B 5/22* (2013.01); *B32B 5/26* (2013.01); *D21F 7/083* (2013.01); *B32B 2250/20* (2013.01); *B32B 2262/0276* (2013.01); *B32B 2307/102* (2013.01); *B32B 2605/00* (2013.01)

(58) Field of Classification Search
None
See application file for complete search history.

(56) References Cited

U.S. PATENT DOCUMENTS 5,639,403 A * 6/1997 Ida .................... B29C 45/14065
264/255

FOREIGN PATENT DOCUMENTS

| CN | 103240890 A | 8/2013 |
|---|---|---|
| JP | 05-050452 A | 3/1993 |
| JP | 08-207158 A | 8/1996 |
| KR | 2000-0018827 A | 4/2000 |
| KR | 10-2004-0043264 A | 5/2004 |
| KR | 10-0598520 B1 | 7/2006 |
| KR | 10-0779850 B1 | 11/2007 |
| KR | 10-2009-0055383 A | 6/2009 |

* cited by examiner

*Primary Examiner* — Jacob T Minskey
(74) *Attorney, Agent, or Firm* — Morgan, Lewis & Bockius LLP

(57) ABSTRACT

An apparatus and a method for manufacturing multilayer felt to improve NVH (noise, vibration, and harshness) of a vehicle may include supplying first chip felt between an upper mold and a lower mold, and simultaneously, firstly adsorbing the first chip felt on a bottom surface of the upper mold by vacuum pressure applied to vacuum suction gates of the upper mold, supplying second chip felt between the upper mold and the lower mold, and simultaneously, secondly adsorbing the second chip felt on a surface of the first chip felt by vacuum pressure applied to the vacuum suction gates of the upper mold, to stack the second chip felt on the first chip felt, pressing the first chip felt and the second chip felt, which are stacked on each other, using a press molding operation of the upper mold and the lower mold, and forming a multilayer felt product.

2 Claims, 4 Drawing Sheets

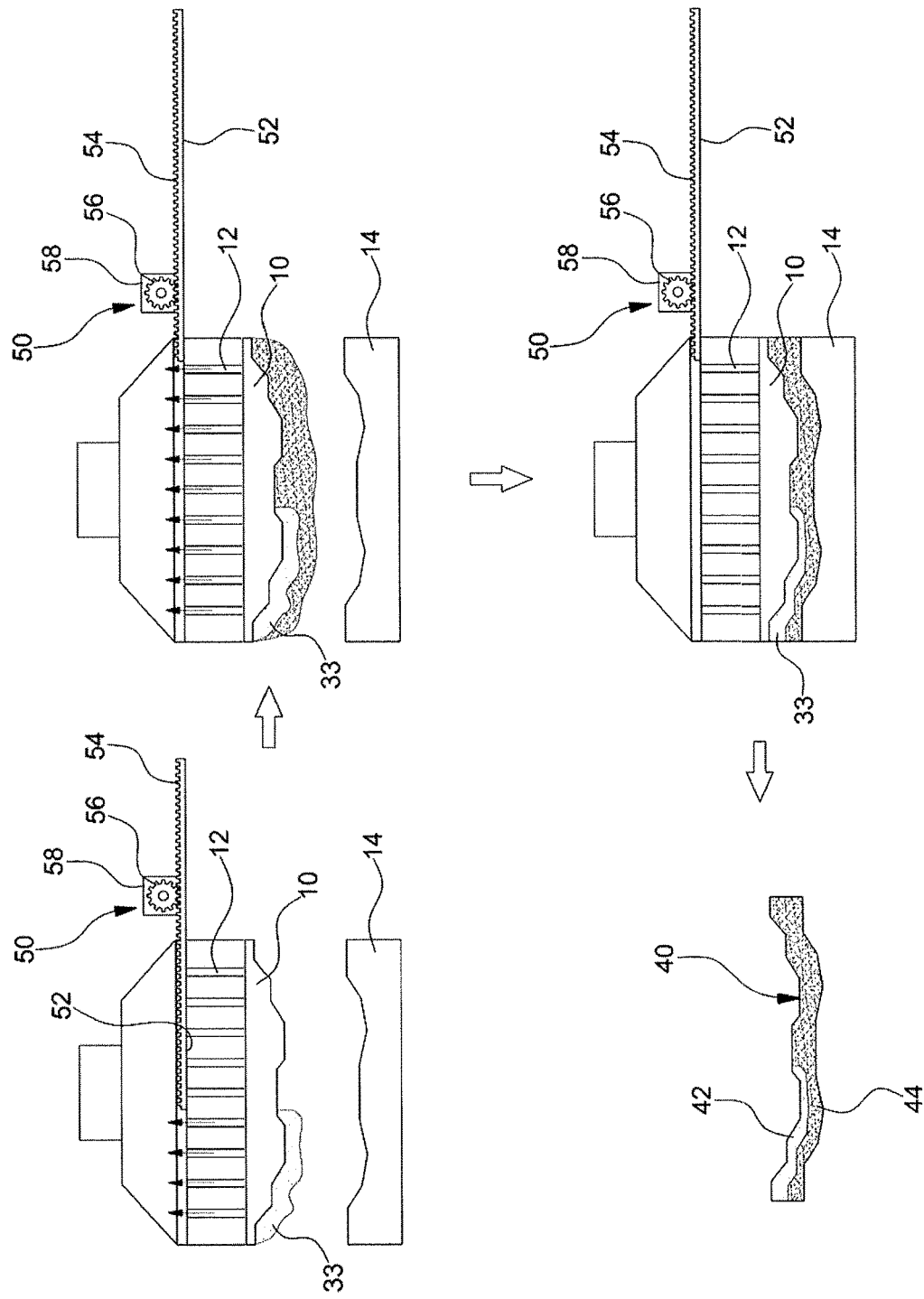

APPARATUS AND METHOD FOR MANUFACTURING MULTILAYER FELT

CROSS-REFERENCE TO RELATED APPLICATION

The present application claims priority to Korean Patent Application No. 10-2014-0006982 filed on Jan. 21, 2014, the entire contents of which are incorporated herein for all purposes by this reference.

BACKGROUND OF THE INVENTION

Field of the Invention

The present disclosure relates to an apparatus and a method for manufacturing multilayer felt. More particularly, it relates to an apparatus and a method for manufacturing multilayer felt capable of manufacturing felt, which is mounted to a dash panel, a floor panel, or the like, in a multilayered structure in order to improve NVH (noise, vibration, and harshness) performance of a vehicle.

Description of Related Art

The term 'NVH' of a vehicle device noise, vibration, harshness, and the like that occur when a vehicle is being driven, and an improvement on NVH performance has no direct relationship with driving performance of the vehicle, but serves to reduce noise, vibration, and the like, or convert noise, vibration, and the like into a pleasant sound in order to provide a driver or an occupant with comfortable ride quality.

As a sound insulator for improving the NVH performance, felt for improving the NVH performance is attached to a dash panel, which partitions an engine room and an occupant compartment of the vehicle, a floor panel that defines a bottom of the occupant compartment, and the like.

Attached FIG. 1 is a schematic view illustrating an apparatus for manufacturing felt in the related art, and FIG. 2 is a process diagram illustrating a process of manufacturing felt in the related art.

In FIGS. 1 and 2, reference numeral 10 indicates an upper mold of a press mold, and reference numeral 20 indicates a lower mold thereof.

The upper mold 10 and the lower mold 20 are disposed in a hermetic molding box 30 (also called a flock box) for preventing dust from scattering, and an opening and closing door 32 is mounted on one surface of the hermetic molding box 30 in order to separate and take out a completely molded felt product from the molds.

In this case, a plurality of vacuum suction gates 12, which are connected with a vacuum source, penetrates the upper mold 10.

In addition, a chip felt supply line 34, which serves to supply chip felt as an original material of the felt, that is, chip felt 33 that is broken into small pieces that may scatter like dust, is connected to a bottom portion of the molding box 30.

In addition, a chip felt supply gate 35, which is connected with a chip felt supply source, is disposed at a front end portion of the chip felt supply line 34 to communicate with the chip felt supply line 34, and a blower fan 36, which serves to allow the chip felt to flow toward the mold, is disposed at a rear end portion of the chip felt supply line 34.

Therefore, the chip felt discharged from the chip felt supply gate 35 is supplied between the upper mold 10 and the lower mold 20 in the hermetic molding box 30 along the chip felt supply line 34 by blowing force that is generated by operating the blower fan 36.

Consecutively, vacuum pressure is applied to the vacuum suction gates 12 of the upper mold 10 as the vacuum source is operated, and in this case, the chip felt 33, which is supplied between the upper mold 10 and the lower mold 20, is adsorbed and fixed on a bottom surface of the upper mold 10 by vacuum pressure.

Consecutively, the upper mold 10 is moved downward toward the lower mold 20, and simultaneously, a pressing process of thermally compressing the chip felt 33 is performed, such that a single-layer molded felt product 38 is completely manufactured using a single chip felt material.

However, fine dust is excessively generated from a surface of the single-layer felt product immediately when the single-layer felt product, which has been manufactured using a single chip felt material, is taken out, and as a result, there is a problem in that the fine dust adversely affects health of a worker and working environment.

In addition, a separate film, which serves to protect an exterior portion of the single-layer molded felt product, may be attached to the surface of the single-layer molded felt product in order to prevent dust from being generated, but there is a problem in that costs increase as a result of the attachment of the film.

The above information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to solving the above-described problems associated with related art, and to providing an apparatus and a method for manufacturing multilayer felt, which may maintain NVH performance, reduce manufacturing costs, and minimize the generation of dust, in comparison with the existing single-layer felt product, by applying a low-cost felt product to an inner layer, and applying a felt material capable of preventing the generation of dust to an outer layer.

Various aspects of the present invention are directed to improving NVH performance and reduce manufacturing costs by forming an inner layer on only portions that may locally improve NVH performance when the felt is manufactured as multilayer felt including the inner layer and an outer layer.

In an aspect of the present invention an apparatus for manufacturing multilayer felt includes an upper mold and a lower mold of a press mold which are disposed in a hermetic molding box in an up and down direction, and press chip felt to form a felt product having a desired shape, a vacuum source which provides vacuum to a plurality of vacuum suction gates formed in the upper mold, a chip felt supply line which supplies the chip felt between the upper mold and the lower mold, and a blower fan which is connected to a rear end portion of the chip felt supply line and supplies the chip felt toward the molds.

The apparatus for manufacturing multilayer felt also includes a first chip felt supply gate for supplying the first chip felt and a second chip felt supply gate for supplying second chip felt are in parallel connected to a front end portion of the chip felt supply line, the first chip felt is supplied from the first chip felt supply gate to between the upper mold and the lower mold, and firstly adsorbed by vacuum pressure to the vacuum suction gates of the upper mold, and thereafter, the second chip felt is supplied from the second chip felt supply gate, and secondly adsorbed by vacuum pressure on a surface of the first chip felt to be stacked on the first chip felt.

A vacuum suction shut-off device, which closes some desired vacuum suction gates among the plurality of vacuum suction gates, may be mounted above the upper mold.

The vacuum suction shut-off device may include a shut-off plate which has a structure having a rack formed on an upper surface thereof, and shuts off some desired vacuum suction gates among the plurality of vacuum suction gates, a pinion which is engaged with the rack of the shut-off plate. a motor which is coaxially connected with the pinion, and provides rotational power to the pinion.

Solenoid valves may be mounted in outlets of the first chip felt supply gate and the second chip felt supply gate, respectively, in order to adjust discharge timing of the first chip felt and the second chip felt.

In another aspect of the present invention, a method for manufacturing multilayer felt may include supplying first chip felt between an upper mold and a lower mold, and simultaneously, firstly adsorbing the first chip felt on a bottom surface of the upper mold by vacuum pressure that is applied to vacuum suction gates of the upper mold, supplying second chip felt, which is different from the first chip felt, between the upper mold and the lower mold, and simultaneously, secondly adsorbing the second chip felt on a surface of the first chip felt by vacuum pressure that is applied to the vacuum suction gates of the upper mold, to stack the second chip felt on the first chip felt, and pressing the first chip felt and the second chip felt, which are stacked on each other, using a press molding operation of the upper mold and the lower mold, to form a multilayer felt product.

Low-cost felt, which is cheaper than general felt, may be applied to the first chip felt.

The second chip felt may be made of a PET (Polyethylene terephthalate) material in order to prevent the generation of dust.

In another aspect of the present invention, a method for manufacturing multilayer felt may include shutting off some of vacuum suction gates of an upper mold, supplying first chip felt between the upper mold and a lower mold, and simultaneously, firstly adsorbing the first chip felt by vacuum pressure on only portions where the vacuum suction gates of the upper mold are opened, supplying second chip felt, which is different from the first chip felt, between the upper mold and the lower mold and simultaneously secondly adsorbing the second chip felt by vacuum pressure over a bottom surface of the upper mold in addition to a surface of the first chip felt by opening the vacuum suction gates that have been shut off, and pressing the second chip felt and the first chip felt, which is stacked on only desired portions of the second chip felt, using a press molding operation of the upper mold and the lower mold, to form a local multilayer felt product.

The first chip felt may have more excellent suction performance and sound insulation performance than the second chip felt.

The second chip felt may be made of a PET material in order to prevent the generation of dust.

Through the aforementioned technical solutions, the present invention provides the effects below.

Firstly, the exemplary embodiment of the present invention provides a multilayer felt product which has the inner layer to which a low-cost felt product is applied, and the outer layer to which a felt material capable of preventing the generation of dust is applied, thereby reducing manufacturing costs and minimizing the generation of dust while maintaining NVH performance in comparison with the existing single-layer felt product.

Secondly, when the multilayer felt product including the inner layer and the outer layer is manufactured, the inner layer is formed as a partial felt layer that may locally improve NVH performance, thereby reducing manufacturing costs.

Other aspects and preferred embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a process diagram illustrating the method for manufacturing multilayer felt according to various exemplary embodiments of present invention.

Figure 1:
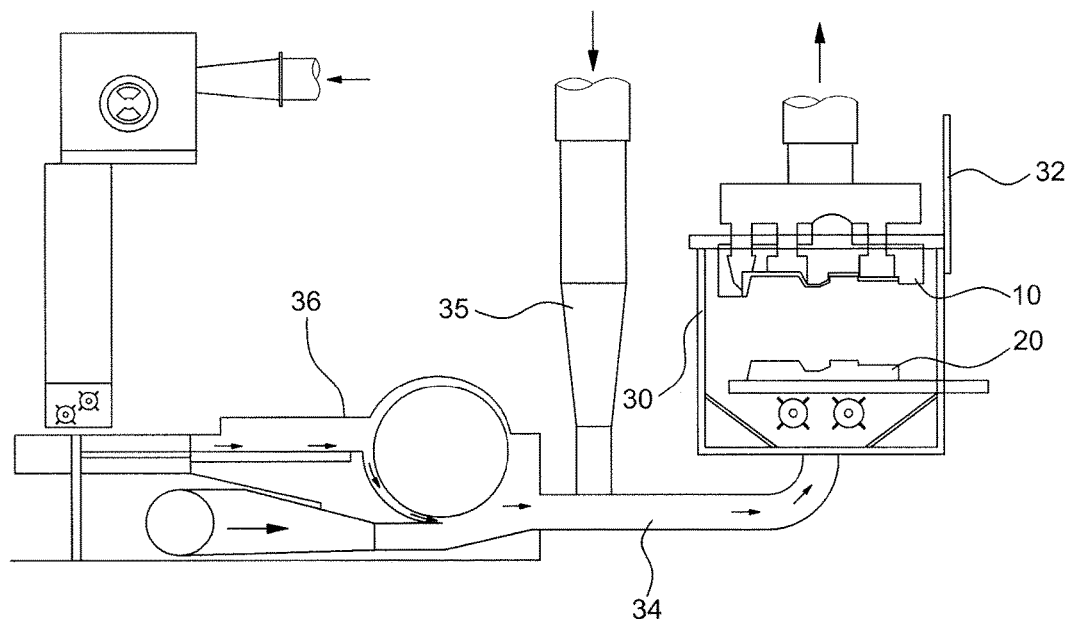
FIG. 1 is a schematic view illustrating an apparatus for manufacturing felt in the related art.
Figure 2:
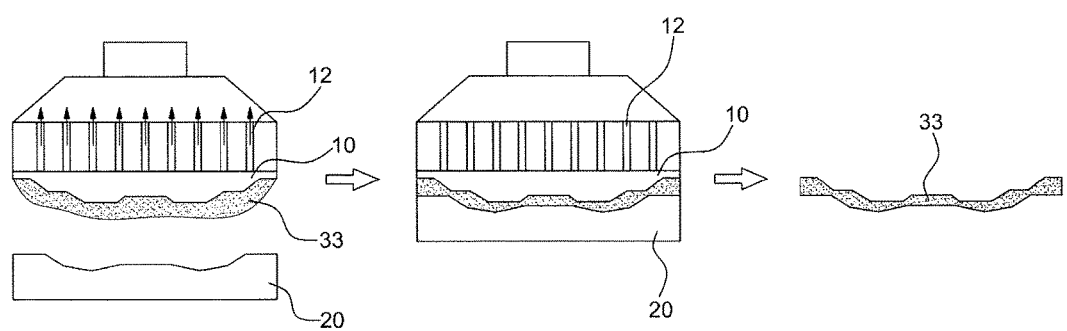
FIG. 2 is a process diagram illustrating a process of manufacturing felt in the related art.

Reference numerals set forth in the Drawings includes reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the Field of the Invention to which the present invention pertains may carry out the exemplary embodiments.

The present invention relates to felt, which is attached to a dash panel that partitions an engine room and an occupant compartment of a vehicle, a floor panel that defines a bottom of the occupant compartment, and the like, in order to improve NVH performance, and which may be manufactured to have multiple layers to reduce manufacturing costs and prevent the generation of dust.

A configuration of an apparatus for manufacturing multilayer felt according to an exemplary embodiment of the present invention will be described below.

Figure 3:
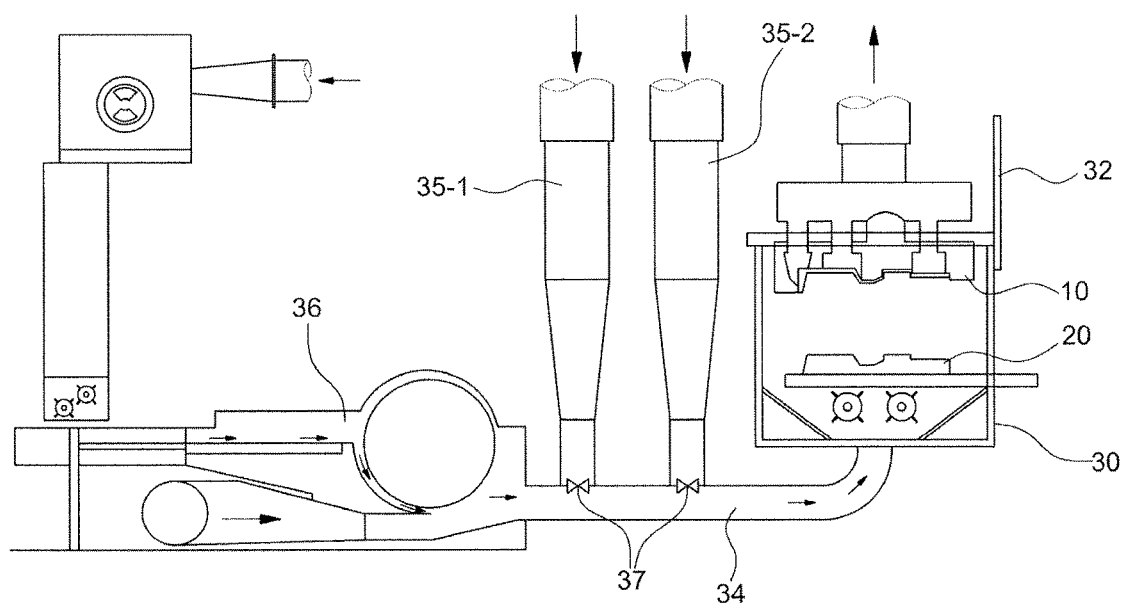
FIG. 3 is a schematic view illustrating an apparatus for manufacturing multilayer felt according to various embodiments of the present invention.
Figure 5:
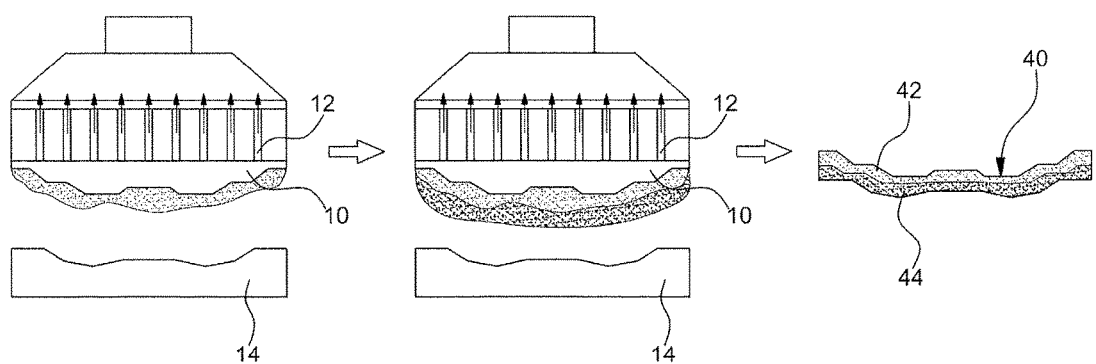
FIG. 5 is a process diagram illustrating a method for manufacturing multilayer felt according to various exemplary embodiments of the present invention.

FIG. 3 is a schematic view illustrating an apparatus for manufacturing felt according to an exemplary embodiment of the present invention, and FIG. 5 is a process diagram illustrating a method for manufacturing the felt according to an exemplary embodiment of the present invention.

In FIGS. 3 and 5, reference numeral 10 indicates an upper mold of a press mold, and reference numeral 20 indicates a lower mold thereof.

As described above, the upper mold 10 and the lower mold 20 are disposed in a hermetic molding box 30 (also called a flock box) for preventing dust from scattering, and an opening and closing door 32 is mounted on a surface of the hermetic molding box 30 in order to separate and take out a completely molded felt product from the molds.

In this case, a plurality of vacuum suction gates 12, which are connected with a vacuum source penetrate the upper mold 10.

In addition, a chip felt supply line 34, which serves to supply chip felt as an original material of the felt, that is, chip felt 33 that is broken into small pieces that may scatter like dust, is connected to a bottom portion of the molding box 30.

In an aspect of the present invention, a first chip felt supply gate 35-1 for supplying first chip felt, and a second chip felt supply gate 35-2 for supplying second chip felt are disposed in parallel and connected to a front end portion of the chip felt supply line 34.

In this case, the first chip felt supplied from the first chip felt supply gate 35-1, and the second chip felt supplied from the second chip felt supply gate 35-2 are made of different types of felt materials, and low-cost felt, which is cheaper than the existing general felt, is applied to the first chip felt, and felt, which is made of a PET (Polyethylene terephthalate) material in order to prevent the generation of dust, is applied to the second chip felt.

Solenoid valves 37 may be mounted in outlets of the first chip felt supply gate 35-1 and the second chip felt supply gate 35-2, respectively, in order to adjust discharge timing of the first chip felt and the second chip felt to the chip felt supply line 34.

Meanwhile, a blower fan 36, which serves to allow the first chip felt or the second chip felt to flow toward the mold, is disposed at a rear end portion of the chip felt supply line 34.

Hereinafter, a method for manufacturing multilayer felt according to an exemplary embodiment of the present invention will be described below.

First, the solenoid valve 37 mounted in the outlet of the first chip felt supply gate 35-1 is opened, and the first chip felt (low-cost felt) supplied from the first chip felt supply gate 35-1 is supplied between the upper mold 10 and the lower mold 20 in the hermetic molding box 30 along the chip felt supply line 34 by blowing force that is generated by operating the blower fan 36.

Consecutively, vacuum pressure is applied to the vacuum suction gates 12 of the upper mold 10 as the vacuum source is operated, and in this case, the first chip felt, which is supplied between the upper mold 10 and the lower mold 20, is firstly adsorbed, tightly attached and fixed on a bottom surface of the upper mold 10 by vacuum pressure.

Next, the solenoid valve 37 mounted in the outlet of the first chip felt supply gate 35-1 is closed, the solenoid valve 37 mounted in the outlet of the second chip felt supply gate 35-2 is opened, and the second chip felt (PET (Polyethylene terephthalate) felt) supplied from the second chip felt supply gate 35-2 is supplied between the upper mold 10 and the lower mold 20 in the hermetic molding box 30 along the chip felt supply line 34 by blowing force that is generated by operating the blower fan 36.

Consecutively, vacuum pressure, which is applied to the vacuum suction gates 12 of the upper mold 10, is applied to a bottom portion of the first chip felt, and the second chip felt is secondly adsorbed on the bottom surface of the first chip felt by vacuum pressure, and stacked on the first chip felt.

Therefore, when the first chip felt and the second chip felt are stacked on each other, the first chip felt and the second chip felt, which are stacked on each other, are thermally compressed by a high-temperature press molding operation of the upper mold 10 and the lower mold 20, and formed as a multilayer felt product 40.

The multilayer felt product 40, which is formed as described above, has an inner layer that forms a low-cost felt layer 42 by the first chip felt, and an outer layer 44 that forms a dust prevention material layer by the second chip felt, which is made of a PET material.

As such, various aspects of the present invention provide a multilayer felt product which has the inner layer to which a low-cost felt product is applied, and the outer layer to which a felt material capable of preventing the generation of dust is applied, thereby reducing manufacturing costs and minimizing the generation of dust while maintaining NVH performance in comparison with the existing single-layer felt product.

Hereinafter, an apparatus and a method of manufacturing felt according another exemplary embodiment of the present invention will be described below.

Figure 4:
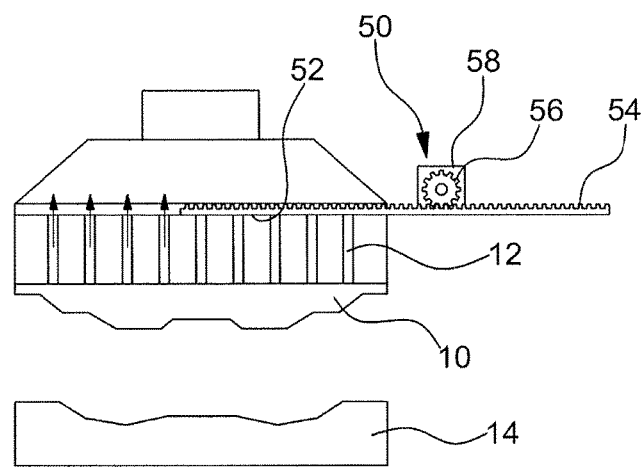
FIG. 4 is a schematic view illustrating the apparatus for manufacturing multilayer felt according to various exemplary embodiments of the present invention.

FIG. 4 is a configuration diagram illustrating a vacuum suction shut-off device, which opens and closes vacuum suction gates of an upper mold, and FIG. 6 is a manufacturing process diagram according to various exemplary embodiments of the present invention.

In another aspect of the present invention, when a multilayer felt product is manufactured, an inner layer of the multilayer felt product is manufactured as a partial felt layer in which felt is applied to only a local portion.

To this end, a vacuum suction shut-off device 50, which may close some desired vacuum suction gates among the plurality of vacuum suction gates 12, is mounted above the upper mold 10.

The vacuum suction shut-off device 50 includes a shut-off plate 52 which has a plate structure having a rack 54 formed on an upper surface thereof, and shuts off some desired vacuum suction gates 12 among the plurality of vacuum suction gates, a pinion 56 which is engaged with the rack 54 of the shut-off plate 52, and a motor 58 which is coaxially connected with the pinion 56, and provides rotational power to the pinion 56.

In order to form the partial felt layer according to another exemplary embodiment of the present invention, a process of shutting off some of the vacuum suction gates 12 of the upper mold 10 is first performed.

That is, when the motor 58 of the vacuum suction shut-off device 50 is driven to be rotated forward, and then the pinion 56 is rotated, the shut-off plate 52 having the rack 54 moves forward and shuts off some desired vacuum suction gates 12 among the plurality of vacuum suction gates 12.

Consecutively, the solenoid valve mounted in the outlet of the first chip felt supply gate 35-1 is opened, and the first chip felt (made of a material having excellent suction performance and sound insulation performance) supplied from the first chip felt supply gate 35-1 is supplied between the upper mold 10 and the lower mold 20 in the hermetic molding box 30 along the chip felt supply line 34 by blowing force that is generated by operating the blower fan 36.

Consecutively, as the vacuum source is operated, vacuum pressure is applied to the remaining vacuum suction gates 12 among the plurality of vacuum suction gates 12 of the upper mold 10 except for the vacuum suction gates 12 that are shut off by the shut-off plate 52, and in this case, the first chip felt, which is supplied between the upper mold 10 and the lower mold 20, is partially adsorbed on the bottom surface of the upper mold 10 by vacuum pressure.

That is, the first chip felt (made of a material having excellent suction performance and sound insulation performance) is firstly adsorbed by vacuum pressure on only portions where the vacuum suction gates 12 of the upper mold 10 are opened.

Consecutively, the motor 58 of the vacuum suction shut-off device 50 is driven to be rotated rearward, and the shut-off plate 52 is moved back to the original position, such that all of the vacuum suction gates 12, which have been shut off, are opened.

Next, the solenoid valve mounted in the outlet of the first chip felt supply gate 35-1 is closed, the solenoid valve mounted in the outlet of the second chip felt supply gate 35-2 is opened, and the second chip felt (for example, PET felt) supplied from the second chip felt supply gate 35-2 is supplied between the upper mold 10 and the lower mold 20 in the hermetic molding box 30 along the chip felt supply line 34 by blowing force that is generated by operating the blower fan 36.

Consecutively, the second chip felt is secondly adsorbed by vacuum pressure over the bottom surface of the upper mold in addition to the surface of the first chip felt.

Therefore, when the first chip felt is partially stacked on the second chip felt, the second chip felt and the first chip felt, which is stacked only on desired portions of the second chip felt, are thermally compressed by a press molding operation of the upper mold and the lower mold, and formed as a multilayer felt product 40 having a local and partial felt layer.

The partial felt layer of the multilayer felt product 40, which is manufactured in accordance with another exemplary embodiment of the present invention, may be concentratedly disposed at a local position, which requires sound absorption and sound insulation, in order to improve NVH performance.

As such, when the multilayer felt product including the inner layer and the outer layer is manufactured, the inner layer is formed as a partial felt layer, thereby improving NVH performance, and reducing manufacturing costs.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for manufacturing multilayer felt, comprising:
   an upper mold and a lower mold of a press mold which are disposed in a hermetic molding box in an up and down direction, and press chip felt to form a felt product having a desired shape;
   a vacuum source which provides vacuum to a plurality of vacuum suction gates formed in the upper mold;
   a chip felt supply line which supplies the chip felt between the upper mold and the lower mold; and
   a blower fan which is connected to a rear end portion of the chip felt supply line and supplies the chip felt toward the molds,
   wherein a first chip felt supply gate for supplying first chip felt and a second chip felt supply gate for supplying second chip felt are in parallel connected to a front end portion of the chip felt supply line,
   wherein the first chip felt is supplied from the first chip felt supply gate to between the upper mold and the lower mold, and firstly adsorbed by vacuum pressure to the vacuum suction gates of the upper mold,
   wherein the second chip felt is supplied from the second chip felt supply gate, and secondly adsorbed by vacuum pressure on a surface of the first chip felt to be stacked on the first chip felt,
   wherein a vacuum suction shut-off device, which closes desired vacuum suction gates among the plurality of vacuum suction gates, is mounted above the upper mold, and
   wherein the vacuum suction shut-off device includes:
   a shut-off plate which has a structure having a rack formed on an upper surface thereof, and shuts off the desired vacuum suction gates among the plurality of vacuum suction gates;
   a pinion which is engaged with the rack of the shut-off plate; and
   a motor which is coaxially connected with the pinion, and provides rotational power to the pinion to selectively moves the shut-off plate above the plurality of vacuum suction gates.

2. The apparatus of claim 1, wherein solenoid valves are mounted in outlets of the first chip felt supply gate and the second chip felt supply gate, respectively, in order to adjust discharge timing of the first chip felt and the second chip felt.

\* \* \* \* \*